Figure 1:
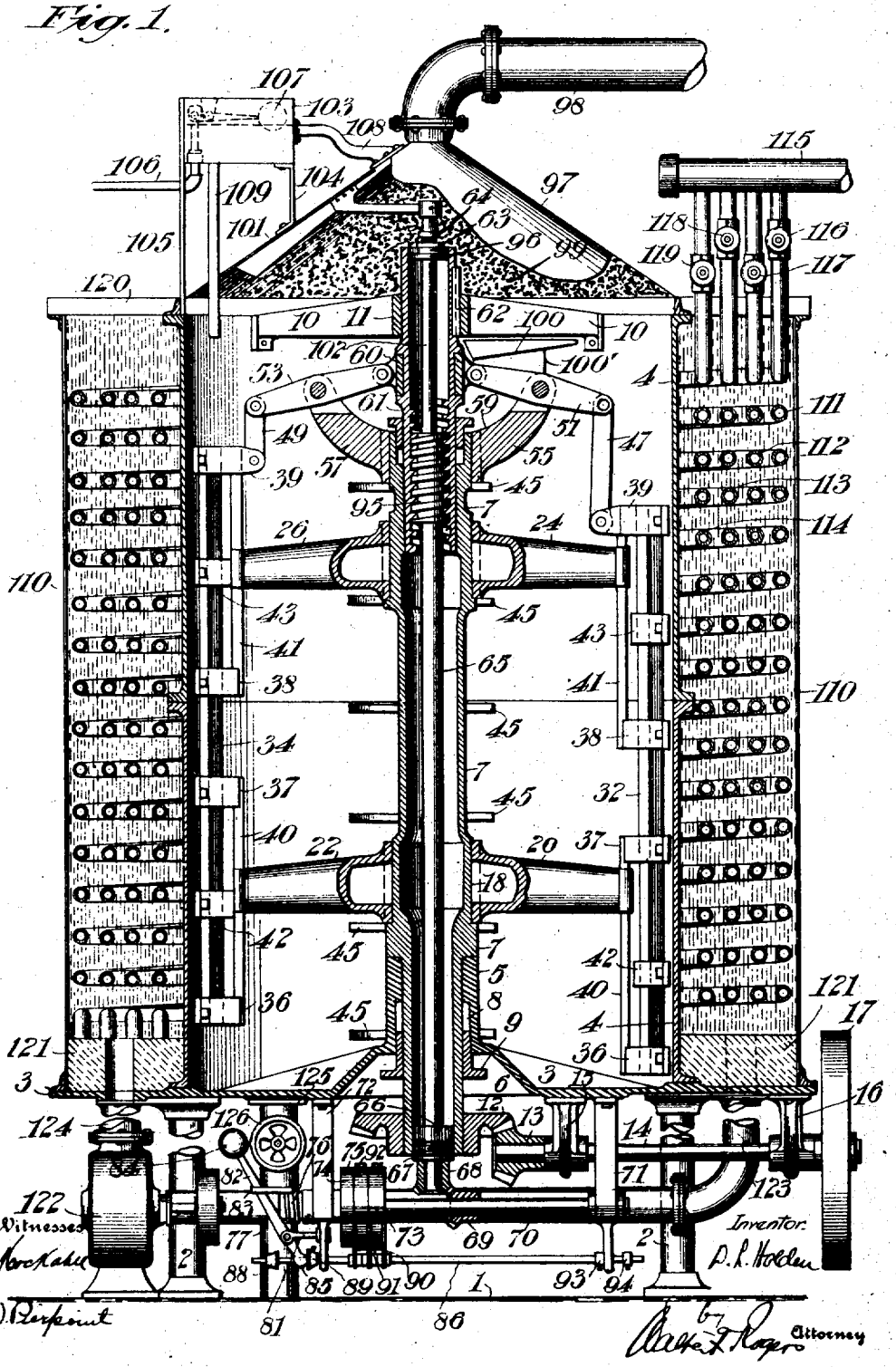

D. L. HOLDEN.

VERTICAL ICE MACHINE.

APPLICATION FILED MAR. 25, 1909.

Reissued July 27, 1909.

13,000.

2 SHEETS—SHEET 1.

Witnesses

Inventor

D. L. Holden

Attorney

D. L. HOLDEN.
VERTICAL ICE MACHINE.
APPLICATION FILED MAR. 25, 1909.
Reissued July 27, 1909.
13,000.
2 SHEETS—SHEET 2.
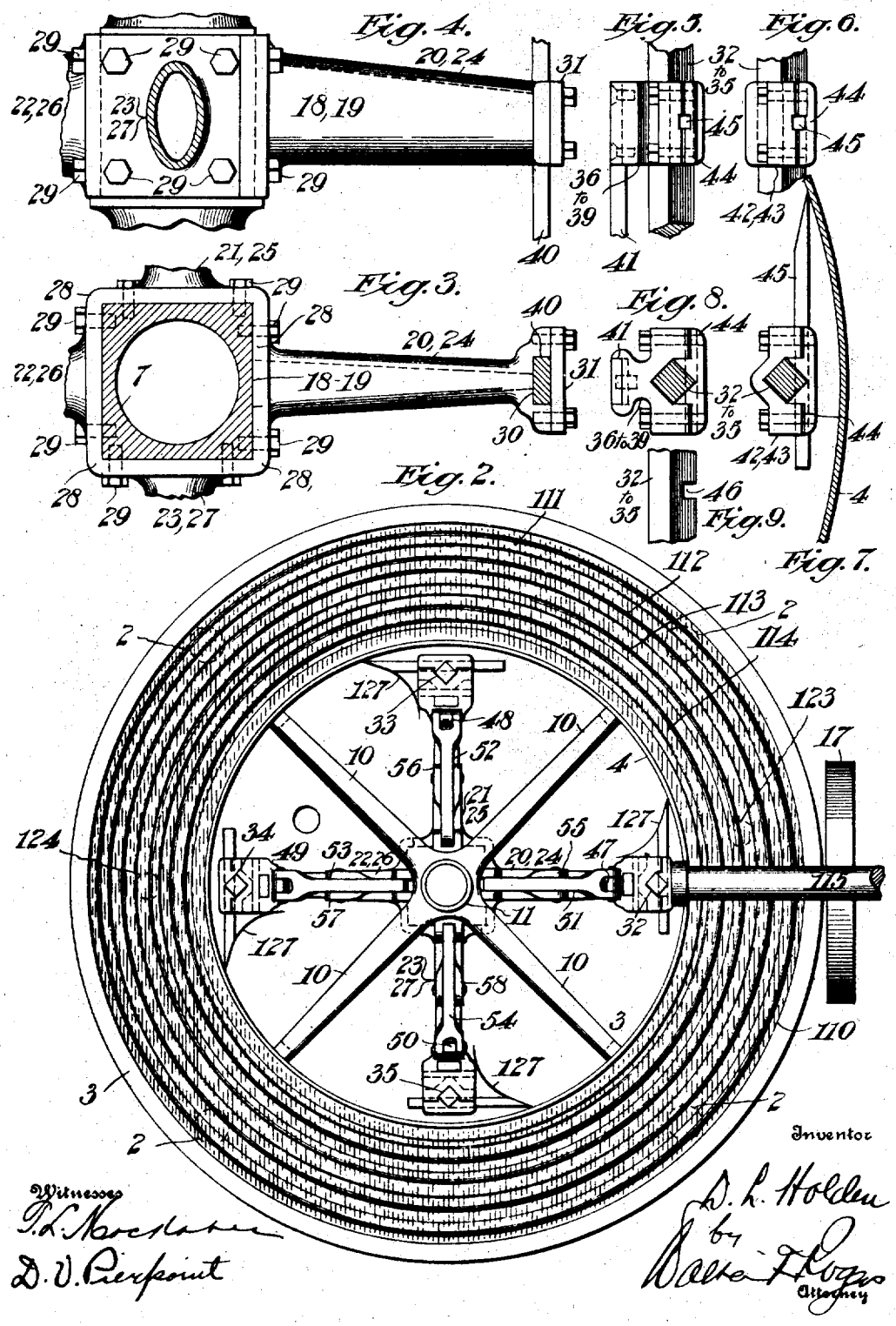
Witnesses
T. L. Moorhouse
D. V. Pierpoint
Inventor
D. L. Holden
by
Walter F. Boggs
Attorney

UNITED STATES PATENT OFFICE.

DANIEL L. HOLDEN, OF NEW YORK, N. Y., ASSIGNOR, BY MESNE ASSIGNMENTS, TO FEDERAL ICE MACHINE COMPANY, A CORPORATION OF MAINE.

VERTICAL ICE-MACHINE.

No. 13,000. Specification of Reissued Letters Patent. Reissued July 27, 1909.

Original No. 892,424, dated July 7, 1908, Serial No. 307,320. Application for reissue filed March 25, 1909. Serial No. 485,863.

*To all whom it may concern:*

Be it known that I, DANIEL L. HOLDEN, a citizen of the United States, residing at New York, in the borough of Manhattan, county of New York, and State of New York, have invented certain new and useful Improvements in Vertical Ice-Machines; and I do hereby declare the following to be a full, clear, and exact description of the invention, such as will enable others skilled in the art to which it appertains to make and use the same.

This invention relates to improvements in ice manufacturing machines for the production of ice in great quantities and at a rapid rate, and wherein are introduced the necessary means to promote rapid freezing, and rapid and thorough removal of the ice coating in small particles which are floated above the clear water, for removal to ice presses where the particles are consolidated into convenient sized merchantable blocks.

The invention is illustrated in the accompanying drawings, in which—

Figure 1 is a general vertical central section, although some of the minor parts are not in section; Fig. 2 is a top view, the hood and cover being removed; Fig. 3 is a plan of one of the driving arms showing the manner of attaching the arms to the hollow vertical driving shaft, and the guide attachments; Fig. 4 is an elevation of Fig. 3; Fig. 5 is a fragmentary elevation of a guide, its holder, cutter bar and cutter holder; Fig. 6 is an elevation of an intermediate cutter holder; Fig. 7 is a plan of a cutter holder, and cutter with a cutter bar in section, and a section of the freezing cylinder, showing their relative positions; Fig. 8 is a plan of the guide and cutter bar holder; Fig. 9 is a fragmentary elevation of a cutter bar showing a cutter seat.

Similar characters of reference indicate the same parts wherever used.

Upon a suitable foundation 1 are erected columns 2 which support a bed plate 3, at sufficient height to permit convenient entrance thereunder. Mounted upon and secured to the bed plate is a central or clear water tank 4, shown as made in two parts, as a mere matter of convenience in manufacturing, and when so made the separable parts are tightly secured together as one entire tank. Bed plate 3 has a central raised hub 5 above a recess 6, and on the hub's upper end is carried a hollow vertical driving shaft 7 which passes upward to near the top of tank 4, and downward through and guided by hub 5 to some distance below bed plate 3, a stuffing box 8 being formed around shaft 7 in hub 5 and provided with a follower or gland 9 to prevent any leakage from tank 4 at the junction of the hub and shaft. An upper guide has a series of legs 10 joined to a central hub 11, and it guides the top of shaft 7. Shaft 7 has a bevel gear 12 secured to its lower end, and it is driven by a bevel pinion 13 on a horizontal shaft 14 carried in hangers 15, 16, secured to the bed plate 3, and the shaft has a pulley 17 through which the power is transmitted to the shaft. Shaft 7 is provided with rectangular seats 18 just above hub 5 and other rectangular seats 19 farther up. On seats 18 are secured driving arms 20, 21, 22, 23, and on seats 19 are secured four similar arms, 24, 25, 26, 27. Each arm has a right angled lip 28 bearing against a seat 18 or 19 to relieve the strain on bolts 29 which secure the arms to their respective seats 18, 19 (see Figs. 3, 4). At the outer end of each arm a guide seat 30 is formed and a cap 31 is attached to close the outer side and secure the guide.

Opposite the outer ends of horizontal arms 20 to 23 and 24 to 27 are square depending cutter bars 32, 33, 34, 35, placed to have two corners of the square on a radial line of the tank, and two corners on a circumferential line, thus putting the bar in position for the most effective resistance to the pressure brought to bear against it, and at the same time presenting a section easily secured from turning. Cutter bars 32 to 35 have secured thereto cutter holders 36, 37, 38, 39 and to these cutter holders are also secured guides 40, 41, and the bars have also secured thereto intermediate cutter holders 42, 43 which are clear of the guides 40, 41. Each holder has a cap 44 to secure a cutter 45 to the holder and notches 46 are also formed in each cutter bar wherein the cutters are inserted to secure the cutters, their holders and caps in vertical position (see Figs. 5 to 9 inc.). The cutter bars are free to move up and down in tank 4, by means of the guides 40, 41, and are suspended by links 47, 48, 49, 50 to lever-arms 51, 52, 53, 54 fulcrumed on arms 55, 56, 57, 58 which reach upward from hub 59 secured to and revolving with shaft 7. The inner ends of lever-arms 51 to 54 are pivotally secured to a collar 60 made of separable parts and secured to freely revolve around and to be carried up and down by a vertically actuated and non-revolving sleeve 61 which at its lower end is inserted within the upper end of shaft 7, and at its upper end is guided freely up and down through hub 11 of the upper guide but is prevented from rotary movement by a spline 62. A stuffing box 63 is formed in the upper end of shaft 7, and is provided with a gland 64, to prevent water entering the interior of shaft 7. Within shaft 7 is another shaft 65 having a collar 66 at its lower end which rests upon a nut 67 screwed into shaft 7 and having a hole therethrough for the passing of shaft 65 and below the nut is a gear 68 on the shaft driven by a gear 69 on a horizontal shaft 70 supported in hangers 71, 72 and provided with tight pulleys 73, 74 and a loose pulley 75. At the upper end of shaft 65 it is provided with a screw 95 entering sleeve 61, which acts as a non-rotatable nut, and moves up and down as the screw is turned to the right or left. Means for the spiral movement of cutters 45 within tank 4 are provided, as follows, to enable the narrow cutters to traverse the entire inner surface of the tank, upward and downward and thereby clean off the ice coating, in alternate courses. The shaft 70 is provided with a screw 76 on which is a traveler 77 which is moved back and forth by the screw, and is itself prevented from rotary movement. Secured to traveler 77 is a lifting loop 83 which surrounds a lever 82 and is the means by which the lever is thrown back and forth. Lever 82 has a counterweight 84 at its top, and at its bottom end it is bifurcated, with each jaw 85 circular shaped at the edge, and passing by the sides of shifter rod 86 which is supported in pendants from hangers 71, 72. Upon rod 86 are adjustable collars 88, 89 against which jaws 85 alternately abut, and also shifter fingers 90 which extend upwardly and guide straight belt 91 and crossed belt 92 which pass between them from the source of power. Collars 93, 94, adjustable along rod 86 limit its movement.

The reversing means herein described is the subject of a separate application, but its description is deemed necessary at this point to give a clear understanding of the operation of the machine.

A conical dome 97 surmounts tank 4, and at its apex is attached a delivery pipe 98 leading to a pump (not shown) by which the ice particles 99 are passed to the presses (not shown). A sweep 100 is mounted above arm 55 and is supported by a rod 100′ to remove adhering ice particles which may lodge under arms 10. A sweep 101 is attached to rod 102 secured in screw 95 and passing outward and upward through cap 96, which closes the top of shaft 7 and is provided with a stuffing box, and is the means to remove ice particles which may adhere to the inside of dome 97. A float trap 103 of any suitable construction is mounted on standards 104, 105 above dome 97, and thereto a clear water inlet pipe 106 is attached, it being opened and closed by float 107, the trap having a pipe 108 in communication with the top of dome 97 and a pipe 109 in communication with tank 4. Water will enter trap 103 by pipe 106 and flow to tank 4 by pipe 109, but before the water level reaches a height to enter pipe 98 it will flow through pipe 108, raise float 107, and, closing pipe 106 shut off the inflow.

Surrounding tank 4 is a freezing tank 110 in which are introduced a series of coil pipes 111, 112, 113, 114, encircling tank 4 from top to bottom, they are charged with anhydrous ammonia from an inlet pipe 115, and valves 116, 117, 118, 119 are provided to regulate the supply. The supports for these coils are not shown, as any form that is suitable may be used, and their showing would tend to obscure the other parts shown. The outlet of the coils is at one side of the bottom of tank 110, preferably at the side opposite to the inlet, and the passage therefrom to an ammonia pump is not illustrated, as it can readily be understood. Tank 110 has a covering 120 and is filled with chlorid-calcium solution, except for a space 121 at the bottom which is filled with an insulating material to prevent freezing at the bottom of tank 4. A pump 122 rests on foundation 1, has suitable means for its driving, and therefrom pipe 123 communicates with one side of the bottom of the tank 110, and a pipe 124 communicates with the opposite side, so that by means of the pump there is a continuous circulation of the material surrounding the coils. A pipe 125 is attached to bed plate 3, and is controlled by any suitable valve 126 and is the means for discharging the water from tank 4 whenever it is necessary to make repairs, to adjust cutters, or an entrance to the tank is necessary. Shields 127 are attached to cutter holders 36, 37, 38, 39, 42, 43, and are curved to the taper end of cutters 45 (see Fig. 2) and are employed to prevent the lodging of the ice particles against the cutter holders.

The operation of my mechanism is as follows: Power is applied to the pulley 17 and thereby its shaft 14, gears 12, 13 and shaft 7 are rotated at a speed of about four turns per minute. Arms 20 to 23 and 24 to 27 will then be rotated as will also cutter bars 32 to 35, and all of their attached parts. It must be understood that tank 4 had previously been filled with purified water, and tank 110 with chlorid calcium solution and the coils 111 to 114 with anhydrous ammonia.

By reference to Fig. 1 it will be seen that the depending arms or cutter bars 32 and 34 are at different distances or elevations above bed plate 3, and it must also be understood that cutter bar 33 between 32 and 34, (not shown in Fig. 1 but seen in the background in Fig. 2) is elevated at a distance midway between cutter bars 32, 34, and that cutter bar 35 between 34 and 32 (not shown in Fig. 1 but seen in the foreground in Fig. 2) is also elevated as much above bar 34 as bar 33 is above 32 and as much as bar 34 is above 33.

Another way to understand the relative elevations of the depending arms or cutter bars to each other, and to the bed plate 3, and the cutters and their holders on each bar, relative to the cutters on every other cutter bar, will be to commence at cutter bar 32 and go around the tank 4 until we again come to bar 32. Bar 32 (and every other bar) has a lower cutter holder 36, and all of the cutters and holders on each bar are arranged alike, as seen in Fig. 1 at equal distances apart; there are four cutter bars, and holder 36 and its cutter of bar 33 are above holder 36 of bar 32 one fourth of the distance between holders 36, 42 of bar 32; bar 34 and its holders one fourth above bar 33 and its holders; bar 35 one fourth above bar 34 and its holders, and when reaching bar 32 again its holder 42 is one fourth above holder 36 of bar 35, so that the bars with their holders and cutters are relatively in successive steps of elevation equal to one fourth of the distance between the cutters and holders of an adjacent bar. This different elevation of the bars is done by making links 47 to 50 of different and suitable lengths for the purpose. If as now described the bars and cutters are rotated within the tank 4 the cutters would each chip off the ice in a horizontal plane and of a width equal to their cutting edges and there would be an intervening belt of unchipped ice between each cutter, as the cutters to be effective for the most perfect work must be quite narrow at their cutting edge. To overcome this defect and clean off every particle of the ice it is essential that while the cutters pass around the tank they must also be caused to traverse up and down to clean off the intervening belts, and means are provided for this purpose. When pulley 17 commences to move and to move all its attached parts, the power is also applied to pulley 73 and rotates shaft 70 gears 68, 69, shaft 65 and its screw 95 in direction to pull down sleeve 61 which will be seen in Fig. 1 by means of collar 60, links 47 to 50 and levers 51 to 54 elevate cutter bars 32 to 35 and their attached cutters 45 which will now cut an upwardly tending spiral path, and as the screw 95 gains one thread for each complete rotation of the cutters within tank 4 it will be evident that when they have passed around the tank enough times to remove the intervening belts of ice that the whole interior coating of ice will have been removed in broken particles and have floated to dome 97 for removal to the presses. While the above operation was in progress the screw 76 was moving traveler 77 and its loop 83 to elevate lever 82 and its counterweight 84, so that when the cutters 45 had completed their spiral courses the lever 82 and its counterweight passed the perpendicular line and fell by gravitation to the opposite end of loop 83 and in doing so automatically abutted collar 88 moved rod 86 and fingers 90 to shift crossed belt 92 to pulley 74, and straight belt 91 to loose pulley 75, thus reversing screw 95 and all attached parts and carrying cutters 45 downward over the space heretofore upwardly traversed, and which meantime has become freshly coated with ice. So the operation goes on, the cutters traveling in spiral courses alternately upward and downward. The mechanism can readily be constructed to other proportions so that the number of upward and downward courses of the cutters may be increased or diminished, as well as the number of cutters in use on each arm, or the number of arms.

I claim:

1. In an ice machine, a vertical tank with means for its support, a hollow shaft within the tank, an upper series and a lower series of arms thereon, horizontally extending, and guides and cutters at their outer ends secured for vertical movement, with means for producing such movement in spiral courses upward and in spiral courses downward, alternately.

2. In an ice machine, a vertical tank, a hollow shaft therein, an inner shaft within the hollow shaft, arms pivotally secured to the hollow shaft, guides secured to the arms at different elevations and guided for vertical movement, cutter bars secured to the guides, cutter holders on the bars, cutters in the holders, shields for the cutters to prevent the lodgment of ice particles, and means operative by the inner shaft to elevate and depress the cutter bars and cutters.

3. In an ice machine, an inner and an outer vertical tank, a rotatable hollow shaft therein, cutter bars and cutters having attachments to and operative by the shaft and whereby they are actuated to remove ice particles from the tank's inner surface, and an inner shaft having means for its rotation in reverse movements, and means thereby operative for reverse vertical movements, arms at the upper end of the hollow shaft which reach outward and upward, levers pivotally supported on the arms, being at their inner ends attached to the inner shaft's means for vertical movement, links of different lengths pivotally attached to each of the levers at its outer end, which at their opposite ends are pivotally attached to and support said cutter bars, and cutters at different heights in the tank.

4. In an ice machine, a vertical tank, a hollow shaft therein, with means for its rotation, cutters supported for rotation by the shaft, with means whereby they are guided for vertical movement; a shaft within the hollow shaft with means for its rotation independent of the means for the rotation of the hollow shaft; a screw threaded sleeve within the hollow shaft, a screw upon the inner shaft and engaging the sleeve aforesaid, a collar upon the sleeve, and pivotally supported arms having one end attached to the collar and their opposite ends having attachments to the cutters aforesaid and whereby the vertical movement of the cutters is accomplished.

5. In an ice machine, a vertical tank, a hollow shaft therein, with means for its rotation, cutters and cutter bars supported for rotation by the shaft, means whereby they are guided for vertical movement; a shaft within the hollow shaft with independent means for its rotation in reverse directions; a non-rotatable screw threaded sleeve within the hollow shaft and free for vertical movement, a screw upon the inner shaft and engaging the sleeve aforesaid, a collar upon the sleeve, and pivotally supported levers having one end attached to the collar and their opposite ends having attachments to said vertically guided cutter bars carrying the cutters aforesaid and whereby the vertical movement of the cutters in spiral courses is accomplished in reverse directions.

6. In an ice machine, a vertical tank, a hollow shaft therein with means for its rotation, arms attached to the shaft and provided with guiding means, bars guided thereby and whereto are attached cutters, each bar being suspended at a different height, an independent and reversely rotatable shaft, means thereto attached to elevate and depress the cutters during the rotation of the hollow shaft to thereby cause the cutters to move in a spiral course upward, and upon the completion of a predetermined number of spiral courses to reverse the spiral courses, downward, and return the cutters to their original positions, the reverse spiral movements continuing during the rotation of the shaft aforesaid.

7. In an ice machine, a bed plate and a vertical tank thereon, a dome covering the tank, an outlet for the dome for passing ice particles to a pump; a hollow shaft in the tank; a shaft supported within and by the hollow shaft; a vertically movable sleeve within the hollow shaft and means for its movement by the inner shaft; an extension of the inner shaft through and guided in the sleeve, and a sweep attached to the extension and adapted to clear the inner surface of the dome of adhering ice particles.

8. In a vertical ice machine, a vertical tank, square cutter bars therein, with means for their rotation and vertical movement within said tank, angular seating holders and caps with openings for cutters, and notches in the bars for securing the holders, their caps, and the cutters in vertical position.

9. In an ice machine, the combination of a vertical tank or cylinder, a shaft within the tank, horizontal arms carried by the shaft, cutters borne by the horizontal arms, and means for imparting a vertical motion to the arms and cutters and means for rotating the arms and cutters.

10. In an ice machine, the combination with a freezing cylinder of cutters and means for imparting a combined rotary and reciprocating motion to the cutters to give them a spiral course over the surface of the freezing cylinder.

11. In an ice machine, the combination of a freezing cylinder, cutters, means for imparting a combined rotary and reciprocating motion to the cutters and means for reversing the direction of movement.

12. In an ice machine, the combination with a vertical tank, of a series of cutters, means for rotating the cutters, and means for alternately gradually elevating the cutters and gradually lowering them.

13. In an ice machine, the combination of a vertical tank, a hollow vertical rotating shaft, a series of lever-arms pivoted to the hollow shaft, a series of depending bars or arms, cutters on the depending bars or arms, a rotating shaft within the hollow shaft, and means for converting its rotary motion into a reciprocating motion imparted to the lever arms.

14. In an ice machine, the combination with a tank, of a pair of concentric shafts, a series of cutter-bars, one of the shafts imparting a rotary motion and the other a reciprocating motion to the cutter-bars.

15. In an ice machine, the combination of a freezing cylinder, a rotating shaft in the cylinder, a series of cutters borne by the shaft, and means for reciprocating the cutters as they are rotated.

16. In an ice machine, the combination of a vertical freezing cylinder, a vertical rotating shaft in the cylinder, a series of cutters suspended from the vertical shaft, and means for reciprocating the cutters.

17. In an ice machine, the combination of a vertical freezing cylinder, a vertical rotating shaft in the cylinder, and a series of cutters suspended from the shaft to different levels within the cylinder.

18. In an ice machine, the combination of a vertical freezing cylinder, a vertical rotating shaft in the cylinder, and a series of cutters suspended from the shaft in successive steps of elevation.

19. In an ice machine, the combination of a vertical freezing cylinder, a vertical rotating shaft in the cylinder, and a series of cutters suspended from the shaft in successive steps of elevation and means for reciprocating the cutters.

20. In an ice machine, the combination of a vertical tank, a rotating shaft in the tank, lever-arms pivoted to the shaft, depending bars or arms borne by the lever-arms, cutters carried by the depending bars or arms, and means for reciprocating the lever-arms.

21. In an ice machine, the combination of a vertical tank, a rotating shaft in the tank, a series of lever-arms pivoted to the shaft, a series of depending bars or arms pivoted to the lever-arms, each depending bar or arm carrying a series of cutters, the cutters of the several series being arranged in successive steps of elevation.

22. In an ice machine, the combination of a vertical tank, a rotating shaft in the tank, a series of lever-arms pivoted to the shaft, a depending bar or arm pivoted to each lever-arm, the depending bars or arms being of different lengths, and cutters at intervals carried by the depending bars or arms.

23. In an ice machine, the combination of a vertical tank having a dôme, a suction device communicating with the dome, cutters and means for actuating the cutters and rotating a sweep within the dome.

24. In an ice machine, the combination of a vertical tank having a dome, a suction device connecting with the dome, a vertical hollow rotating shaft, cutter-bars borne by the shaft, and radial arms extending from the shaft to guide the cutter-bars, and a rotating shaft within the hollow shaft bearing at the top a sweep which operates within the dome.

25. In an ice machine, the combination of a tank, a hollow rotating shaft, a sleeve borne by the shaft, a series of cutter-bars connected to the hollow shaft and the sleeve, a rotating shaft within the hollow shaft and engaging the sleeve, and an automatic reversing mechanism for the gearing of the sleeve-driving shaft.

In testimony whereof I have hereunto signed the specification in the presence of two witnesses.

DANIEL L. HOLDEN.

Witnesses:
P. E. LANSLU,
JOHN KUNTZ.